US011074939B1

(12) United States Patent
Malinowski et al.

(10) Patent No.: US 11,074,939 B1
(45) Date of Patent: Jul. 27, 2021

(54) DISAMBIGUATION OF AUDIO CONTENT USING VISUAL CONTEXT

(71) Applicant: International Business Machines Corporation, Armonk, NY (US)

(72) Inventors: Jason Malinowski, Mahopac, NY (US); Swaminathan Balasubramanian, Troy, MI (US); Cheranellore Vasudevan, Bastrop, TX (US); Thomas G. Lawless, III, Wallkil, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/853,861

(22) Filed: Apr. 21, 2020

(51) Int. Cl.
*G11B 27/036* (2006.01)
*G06K 9/00* (2006.01)
*G10L 15/183* (2013.01)

(52) U.S. Cl.
CPC ........ *G11B 27/036* (2013.01); *G06K 9/00711* (2013.01); *G10L 15/183* (2013.01)

(58) Field of Classification Search
None
See application file for complete search history.

(56) References Cited

U.S. PATENT DOCUMENTS

| 8,374,479 B1* | 2/2013 | Starling | G11B 27/034 |
| | | | 386/201 |
| 2012/0303371 A1* | 11/2012 | Labsky | G10L 17/00 |
| | | | 704/260 |
| 2014/0214415 A1 | 7/2014 | Klein | |
| 2015/0312649 A1* | 10/2015 | Gopalan | H04N 21/458 |
| | | | 725/32 |
| 2016/0140955 A1* | 5/2016 | Connell, II | G10L 15/26 |
| | | | 704/235 |
| 2018/0254044 A1 | 9/2018 | Jitkoff et al. | |
| 2018/0358052 A1* | 12/2018 | Miller | G11B 27/036 |

FOREIGN PATENT DOCUMENTS

CN 102349087 A 2/2012

OTHER PUBLICATIONS

Anonymous, "Method and System for Advertisement Streaming using Gaze Tracking," an ip.com Prior Art Database Technical Disclosure, ip.com No. IPCOM000237387D, Jun. 16, 2014, 3 pgs.
CNBC, "These are the next levels to watch on the S&P 500," https://www.cnbc.com/video/2018/07/05/these-are-the-next-levels-to-watch-on-the-sp-500.html, printed Aug. 1, 2019, 3 pgs.

(Continued)

*Primary Examiner* — Heather R Jones
(74) *Attorney, Agent, or Firm* — Robert J. Shatto

(57) ABSTRACT

Provided is a method for disambiguating an audio component extracted from audiovisual content. Audiovisual content is identified. The audiovisual content includes an audio component and a video component. An ambiguous expression is detected in the audio component. An object referenced by the ambiguous expression is identified in the video component. A verbal description of the object is generated. The verbal description is injected into the audio component to generate a modified audio component.

15 Claims, 6 Drawing Sheets

(56) References Cited

OTHER PUBLICATIONS

Heed et al., "Disentangling the External Reference Frames Relevant to Tactile Localization," https://journals.plos.org/plosone/article?id=10.1371/journal.pone.0158829, published Jul. 8, 2016, 13 pgs.

Mell et al., "The NIST Definition of Cloud Computing," Recommendations of the National Institute of Standards and Technology, U.S. Department of Commerce, Special Publication 800-145, Sep. 2011, 7 pgs.

Shusterman et al., "Frames of reference in spatial language acquisition," https://www.sciencedirect.com/science/article/pii/S0010028516301190, © 2016 The Authors, published by Elsevier Inc., 47 pgs.

Unknown, "Web Content Accessibility Guidelines (WCAG) Overview," https://www.w3.org/WAI/standards-guidelines/wcag/, printed Apr. 20, 2020, 3 pgs.

Xu et al., "A Real-time Hand Gesture Recognition and Human-Computer Interaction System," https://arxiv.org/pdf/1704.07296.pdf, arXiv:1704.07296v1 [cs.CV], Apr. 24, 2017, 8 pgs.

\* cited by examiner

US 11,074,939 B1

DISAMBIGUATION OF AUDIO CONTENT USING VISUAL CONTEXT

BACKGROUND

The present disclosure relates to audiovisual content analysis, and more specifically to disambiguating an audio component of audiovisual content.

Audiovisual content can be broadcast or distributed in audio-only form or can be presented a user who is not viewing the visual portion of the audiovisual content. Through the normal course of creating audiovisual content, broadcasters, persons depicted in the video, or other entities can use words, gestures, or other cues which refer to objects and images on the screen which a viewer can see, but a listener who is not viewing the audiovisual content cannot see, which can diminish understanding for the listener.

SUMMARY

Disclosed herein are embodiments of a method, system, and computer program product for disambiguating an audio component extracted from audiovisual content. Audiovisual content is identified. The audiovisual content includes an audio component and a video component. An ambiguous expression is detected in the audio component. An object referenced by the ambiguous expression is identified in the video component. A verbal description of the object is generated. The verbal description is injected into the audio component to generate a modified audio component.

Additional embodiments include systems and computer program products for performing the above method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
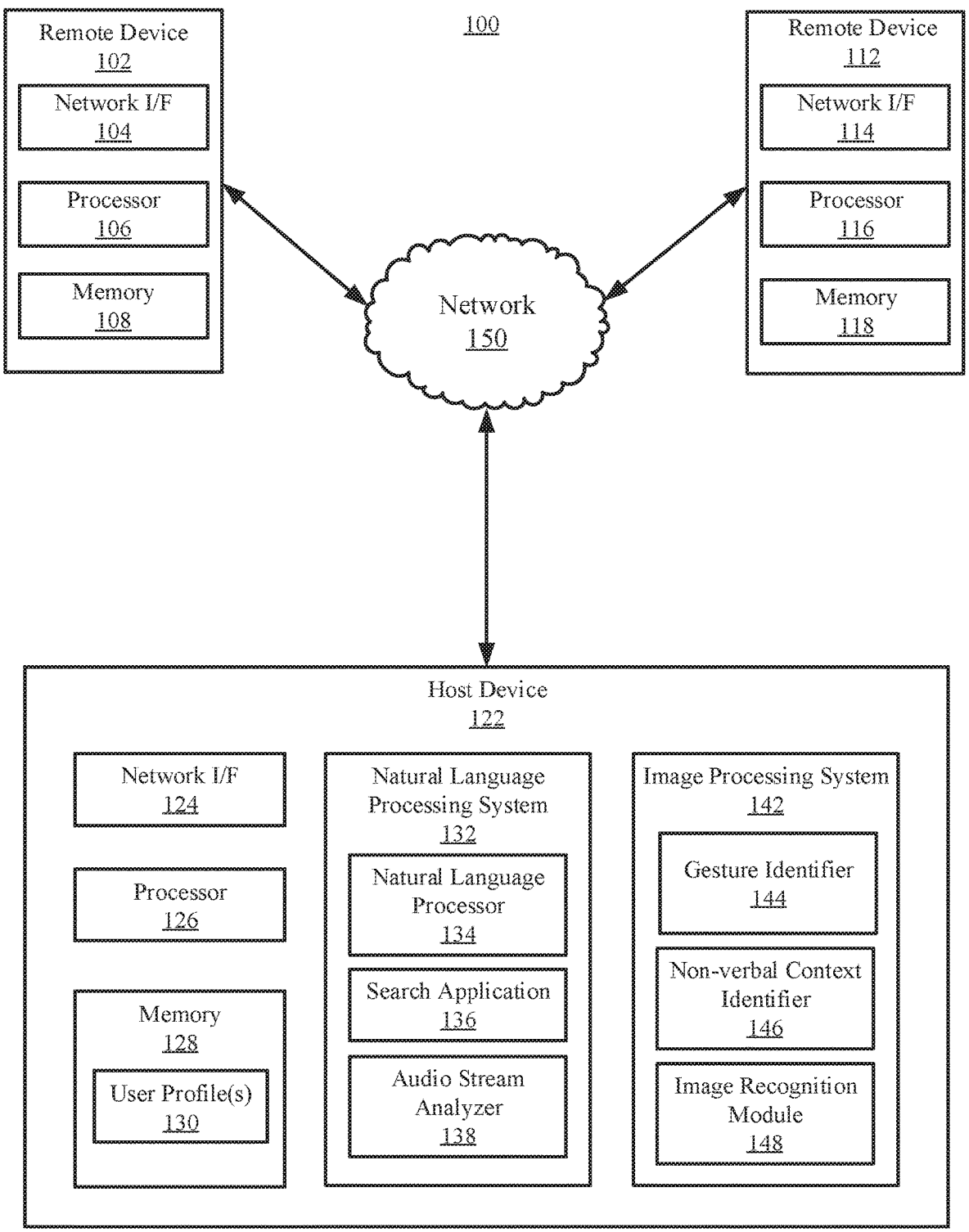
FIG. 1 illustrates a block diagram of an example computing environment in which illustrative embodiments of the present disclosure may be implemented.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to audiovisual content analysis, and more particular aspects relate to disambiguating an audio component of audiovisual content. While the present disclosure is not necessarily limited to such applications, various aspects of the disclosure may be appreciated through a discussion of various examples using this context.

Audiovisual content can be broadcast or distributed in audio-only form (e.g., a podcast) or can be presented to a user who is not viewing the visual portion of the audiovisual content. Through the normal course of creating audiovisual content, broadcasters, persons depicted in the video, or other entities can use words, gestures, or other cues which refer to objects and images on the screen which a viewer can see, but a listener who is not viewing the audiovisual content cannot see. Similarly, even a user watching the video feed may find the audio content ambiguous in certain circumstances (e.g., if the audio references something not actually shown on the screen, or if the reference itself is confusing or ambiguous). These words, phrases, or other content may be ambiguous (e.g., to all users, to a user who is only listening to the audio content, etc.) and are referred to herein as an ambiguous expression(s) and/or word(s) or phrase(s) for disambiguation.

A user who is viewing the screen can generally disambiguate the ambiguous expression using the image(s) displayed, any gestures or motions occurring in the video, or any other content displayed visually. Current means for disambiguating such words or content for one or more users that are only listening to the audio portion include use of a human transcriber who can create text to add to the audio to describe what is occurring on the screen of a video; however, this requires manual human intervention for every such occurrence in every audiovisual content which requires disambiguation.

As described herein, a method, system, and computer program product are provided for disambiguating an audio component of audiovisual content (also referred to herein as an audio stream). Audiovisual content can be identified for disambiguation. The audio component of the audiovisual content can be processed and monitored to enable identification of word(s) or phrases for disambiguation. These word(s) or phrases can be associated with relative spatial frames displayed in the video component of the audiovisual content. The corresponding portion of the video component can be identified, and image(s) in the corresponding portion of the video component can be identified. A verbal description can be generated from the identified word(s) or phrases and the identified image(s). The verbal description can be adjusted based on an audience profile, which can relate to one or more users listening to the audiovisual content. The verbal description is then inserted into the audio component of the audiovisual content.

A method, system, and computer program product for disambiguating an audio stream of audiovisual content as described herein can provide advantages over prior methods (i.e., human transcription). As disclosed herein, an automatic procedure can be employed which utilizes the audio component (e.g., using natural language processing), video component (e.g., using image analysis), and in some embodiments an audience profile to generate a verbal description without human intervention. Such a procedure can provide disambiguation in situations where a human transcriber is not available and can do so by any person involved with the audiovisual content including the creator, distributor, or end user. The disambiguation can occur based on user prompt as needed and can be tailored to the needs or desires of the audience involved in a way that human transcribers cannot.

These improvements and/or advantages are a non-exhaustive list of example advantages. Embodiments of the present disclosure exist which can contain none, some, or all of the aforementioned advantages and/or improvements.

As discussed above, aspects of the disclosure may relate to natural language processing. Accordingly, an understanding of the embodiments of the present invention may be aided by describing embodiments of natural language processing systems and the environments in which these systems may operate. Turning now to the figures, FIG. 1 illustrates a block diagram of an example computing environment 100 in which illustrative embodiments of the present disclosure may be implemented. In some embodiments, the computing environment 100 may include two remote devices 102 and 112 and a host device 122.

Consistent with various embodiments, the host device 122 and the remote devices 102 and 112 may be computer systems. The remote devices 102 and 112 and the host device 122 may include one or more processors 106, 116, and 126 and one or more memories 108, 118, and 128, respectively. The remote devices 102 and 112 and the host device 122 may be configured to communicate with each other through an internal or external network interface 104, 114, and 124. The network interfaces 104, 114, and 124 may be, for example, modems or network interface cards. The remote devices 102 and 112 and/or the host device 122 may be equipped with a display or monitor. Additionally, the remote devices 102 and 112 and/or the host device 122 may include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.). In some embodiments, the remote devices 102 and 112 and/or the host device 122 may be servers, desktops, laptops, or hand-held devices.

The remote devices 102 and 112 and the host device 122 may be distant from each other and communicate over a network 150. In some embodiments, the host device 122 may be a central hub from which remote devices 102 and 112 can establish a communication connection, such as in a client-server networking model. Alternatively, the host device 112 and remote devices 102 and 112 may be configured in any other suitable networking relationship (e.g., in a peer-to-peer configuration or using any other network topology).

In some embodiments, the network 150 can be implemented using any number of any suitable communications media. For example, the network 150 may be a wide area network (WAN), a local area network (LAN), an internet, or an intranet. In certain embodiments, the remote devices 102 and 112 and the host device 122 may be local to each other, and communicate via any appropriate local communication medium. For example, the remote devices 102 and 112 and the host device 122 may communicate using a local area network (LAN), one or more hardwire connections, a wireless link or router, or an intranet. In some embodiments, the remote devices 102 and 112 and the host device 122 may be communicatively coupled using a combination of one or more networks and/or one or more local connections. For example, the first remote device 102 may be hardwired to the host device 122 (e.g., connected with an Ethernet cable) while the second remote device 112 may communicate with the host device using the network 150 (e.g., over the Internet).

In some embodiments, the network 150 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 150.

In some embodiments, the remote devices 102 and 112 may be used to provide audiovisual content to users. For example, the remote devices 102 and 112 may include a user interface (UI) and one or more applications (not shown) that play video and/or audio content. The video playback applications may be in the form of a web browser or any other suitable software module, and the UI may be any type of interface (e.g., command line prompts, menu screens, graphical user interfaces). The UI may allow a user to interact with the remote devices 102 and 112 to retrieve and play audio streams that have been analyzed and modified by the host device 122.

In some embodiments, the host device 122 may include a natural language processing system 132. The natural language processing system 132 may include a natural language processor 134, a search application 136, and an audio stream analyzer 138. The natural language processor 134 may include numerous subcomponents, such as a tokenizer, a part-of-speech (POS) tagger, a semantic relationship identifier, and a syntactic relationship identifier. An example natural language processor is discussed in more detail in reference to FIG. 2.

The search application 136 may be implemented using a conventional or other search engine, and may be distributed across multiple computer systems. The search application 136 may be configured to search one or more databases or other computer systems for content that is related to audiovisual content consumed by a remote device 102. For example, the search application 136 may be configured to search dictionaries or other corpus to help identify an ambiguous expression in the audio portion (e.g., the audio stream) of the audiovisual content.

The audio stream analyzer 138 may be configured to analyze an audio stream to identify words or phrases which are ambiguous if the video is not being watched (e.g., words or phrases that reference the video portion of the content). Furthermore, the audio stream analyzer 138 may receive information from the image processing system 142 to generate a verbal description of the object. The verbal description of the object may be a description that helps disambiguate the ambiguous expression. The audio stream analyzer 138 may include one or more modules or units, and may utilize the search application 136, to perform its functions (e.g., to identify potentially ambiguous expressions and generate a verbal description of an object), as discussed in more detail in reference to FIG. 2.

In some embodiments, the host device 122 may include an image processing system 142. The image processing system 142 may be configured to analyze video content (e.g., the video component of the audiovisual content) to determine an object associated with the ambiguous expression (e.g., an object referenced by the ambiguous expression) and information about the object. The image processing system 142 may utilize one or more models, modules, or units to perform its functions (e.g., to analyze the video component to identify the object of interest and information about the object). For example, the image processing system 142 may include one or more image processing models that are configured to identify what portion or object in the video component is associated with the ambiguous expression and information about the identified portion of object.

The image processing models may include a gesture identifier 144 to analyze images in the video component to identify a gesture (e.g., a human pointing, a broadcaster circling a portion of a chart, etc.) and a location of the gesture (e.g., what the user is pointing at or circling). As another example, the image processing system 142 may include a non-verbal context identifier 146 to identify non-verbal context in the video component. The non-verbal context may include arrows, values, highlighting, etc. For example, the non-verbal context for a chart that is referenced by the ambiguous expression may include the title of the chart (e.g., Stock Price of ABC Incorporated) and various values (e.g., a peak value that is circled). The image processing system 142 may further include an image recognition module 148. The image recognition module 148 may perform, for example, object or facial recognition to identify what the object of interest is. In some embodiments, the image processing models may be implemented as software modules.

In some embodiments, the host device 122 may include one or more user profiles 130 stored in the memory 128. The user profiles 130 may store user-specific data that is used by the natural language processing system 132 to identify ambiguous expressions in an audio stream. Additionally, or alternatively, the user profiles 130 may store data that enables the system to generate a verbal description of an identified object. This may enable providing individualized annotations to each user. For example, if the object referenced by the ambiguous expression is a financial chart, the verbal description of the object may include more complex financial information if the user has a high understanding of finance; whereas, a less educated user may receive higher level information. In some embodiments, the user profiles 130 may also store information about how often the user wishes for the system to disambiguate ambiguous expressions. For example, if the user is only listening in the background, the user may only want important information disambiguated, whereas an active listener or a listener trying to learn the material may want all ambiguous expressions disambiguated.

In some embodiments, the host device 122 may have an optical character recognition (OCR) module. The OCR module may be configured to perform optical character recognition (or a related process) on text in the video component to convert it into machine-encoded text so that the natural language processing system 132 may perform NLP on the text. For example, the video component may include a chart that is referenced by the ambiguous expression. The OCR module may convert the image into machine-encoded text, and then the converted text may be sent to the natural language processing system 132 for analysis. In some embodiments, the OCR module may be a subcomponent of the natural language processing system 132. In other embodiments, the OCR module may be a standalone module within the host device 122.

While FIG. 1 illustrates a computing environment 100 with a single host device 122 and two remote devices 102 and 112, suitable computing environments for implementing embodiments of this disclosure may include any number of remote devices and host devices. The various models, modules, systems, and components illustrated in FIG. 1 may exist, if at all, across a plurality of host devices and remote devices. For example, some embodiments may include two host devices. The two host devices may be communicatively coupled using any suitable communications connection (e.g., using a WAN, a LAN, a wired connection, an intranet, or the Internet). The first host device may include a natural language processing system, and the second host device may include an image processing system.

It is noted that FIG. 1 is intended to depict the representative major components of an exemplary computing environment 100. In some embodiments, however, individual components may have greater or lesser complexity than as represented in FIG. 1, components other than or in addition to those shown in FIG. 1 may be present, and the number, type, and configuration of such components may vary.

Figure 2:
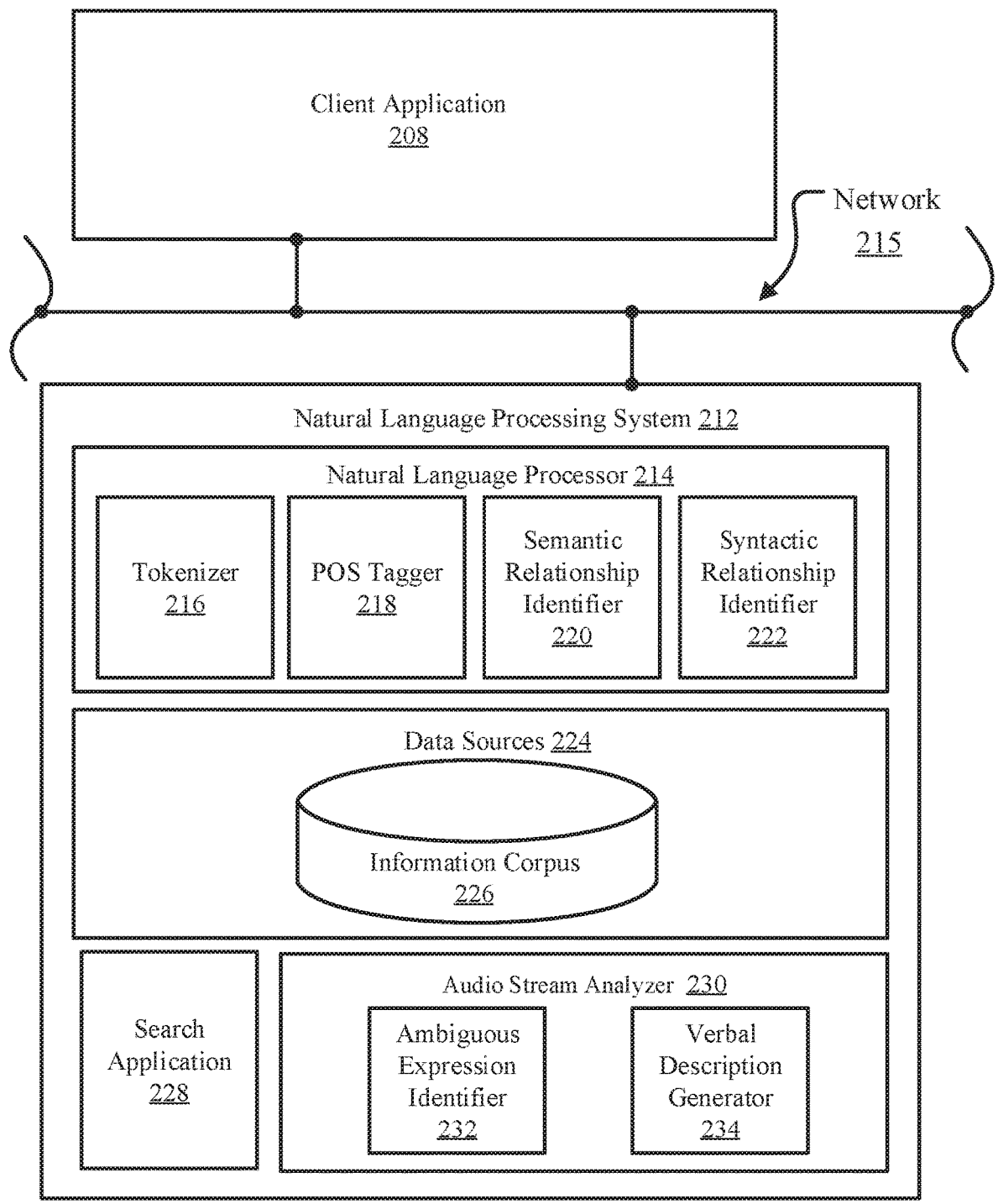
FIG. 2 illustrates a block diagram of an example natural language processing system configured to disambiguate audio content, in accordance with embodiments of the present disclosure.

Referring now to FIG. 2, shown is a block diagram of an exemplary system architecture 200, including a natural language processing system 212, configured to disambiguate audio content, in accordance with embodiments of the present disclosure. In some embodiments, the natural language processing system 212, which may be housed on a host device (such as host device 122 of FIG. 1), may analyze audiovisual content (e.g., a video broadcast) to disambiguate words or phrases in the audio stream (e.g., words that describe something spatial, such as "look at the left side of the curve," "above this point," etc.) and transmit a modified audio stream to a remote device (e.g., remote device 102 of FIG. 1). Such a remote device may include a client application 208, which may itself involve one or more entities operable to receive and play a modified audio stream transmitted by the natural language processing system 212 via a network 215.

Consistent with various embodiments, the natural language processing system 212 may respond to audiovisual content received from a content provider. Specifically, the natural language processing system 212 may analyze a received video stream (with a video component and a corresponding audio component), generate a verbal description to disambiguate an ambiguous expression in the audio stream, inject the verbal description into the audio stream, and provide the audio stream to a remote device. In some embodiments, the natural language processing system is part of the system that the user is using to consume the audio content (e.g., built into a smart TV, tablet, etc.). In these embodiments, the audio stream may be provided directly to the user (e.g., not through a remote device).

In some embodiments, the natural language processing system 212 may include a natural language processor 214, data sources 224, a search application 228, and an audio stream analyzer 230. The natural language processor 214 may be a computer module that analyzes the audio stream. The natural language processor 214 may perform various methods and techniques for analyzing the audio stream (e.g., speech-to-text analysis, syntactic analysis, semantic analysis, etc.). The natural language processor 214 may be configured to recognize and analyze any number of natural languages. In some embodiments, the natural language processor 214 may parse portions of the audio stream. Further, the natural language processor 214 may include various modules to perform analyses of text generated from the audio stream. These modules may include, but are not limited to, a tokenizer 216, a part-of-speech (POS) tagger 218, a semantic relationship identifier 220, and a syntactic relationship identifier 222.

In some embodiments, the tokenizer 216 may be a computer module that performs lexical analysis. The tokenizer 216 may convert a sequence of characters into a sequence of tokens. A token may be a string of characters included in an electronic document and categorized as a meaningful symbol. Further, in some embodiments, the tokenizer 216 may identify word boundaries in an electronic document and break any text passages within the document into their component text elements, such as words, multiword tokens, numbers, and punctuation marks. In some embodiments, the tokenizer 216 may receive a string of characters, identify the lexemes in the string, and categorize them into tokens.

Consistent with various embodiments, the POS tagger 218 may be a computer module that marks up a word in passages to correspond to a particular part of speech. The POS tagger 218 may read a passage or other text in natural language and assign a part of speech to each word or other token. The POS tagger 218 may determine the part of speech to which a word (or other text element) corresponds based on the definition of the word and the context of the word. The context of a word may be based on its relationship with adjacent and related words in a phrase, sentence, or paragraph. In some embodiments, the context of a word may be dependent on one or more previously analyzed electronic documents (e.g., the content of one audio stream may shed light on the meaning of text elements in another audio stream). Examples of parts of speech that may be assigned to words include, but are not limited to, nouns, verbs, adjectives, adverbs, and the like. Examples of other part of speech categories that POS tagger 218 may assign include, but are not limited to, comparative or superlative adverbs, wh-adverbs, conjunctions, determiners, negative particles, possessive markers, prepositions, wh-pronouns, and the like. In some embodiments, the POS tagger 218 may tag or otherwise annotate tokens of a passage with part of speech categories. In some embodiments, the POS tagger 218 may tag tokens or words of a passage to be parsed by the natural language processing system 212.

In some embodiments, the semantic relationship identifier 220 may be a computer module that may be configured to identify semantic relationships of recognized text elements (e.g., words, phrases) in documents. In some embodiments, the semantic relationship identifier 220 may determine functional dependencies between entities and other semantic relationships.

Consistent with various embodiments, the syntactic relationship identifier 222 may be a computer module that may be configured to identify syntactic relationships in a passage composed of tokens. The syntactic relationship identifier 222 may determine the grammatical structure of sentences such as, for example, which groups of words are associated as phrases and which word is the subject or object of a verb. The syntactic relationship identifier 222 may conform to formal grammar.

In some embodiments, the natural language processor 214 may be a computer module that may parse text from an audio stream and generate corresponding data structures for one or more portions of the audio stream. For example, in response to receiving an audio stream at the natural language processing system 212, the natural language processor 214 may convert the audio stream to text and output parsed text elements from the audio stream as data structures. In some embodiments, a parsed text element may be represented in the form of a parse tree or other graph structure. To generate the parsed text element, the natural language processor 214 may trigger computer modules 216-222.

In some embodiments, the output of natural language processor 214 may be used by search application 228 to perform a search of a set of (i.e., one or more) corpora to retrieve one or more words or phrases known to cause ambiguity (e.g., one or more ambiguous expressions or phrases commonly used in ambiguous expressions, such as spatial phrase including "look at," "above," etc., and other phrases that commonly reference the video component, such as "as you can see," "shown here," etc.) and associated information (e.g., location information or object information, such as the name of an object) to send to an image processing system. As used herein, a corpus may refer to one or more data sources, such as the data sources 224 of FIG. 2. In some embodiments, the data sources 224 may include data warehouses, information corpora, data models, and document repositories. In some embodiments, the data sources 224 may include an information corpus 226. The information corpus 226 may enable data storage and retrieval. In some embodiments, the information corpus 226 may be a storage mechanism that houses a standardized, consistent, clean, and integrated list of phrases that are often used in ambiguous expressions (e.g., "as you can see by," "this shows," "look at," etc.). The information corpus 226 may also store, for each condition, a list of associated criteria. The data may be sourced from various operational systems. Data stored in the information corpus 226 may be structured in a way to specifically address reporting and analytic requirements. In some embodiments, the information corpus 226 may be a relational database.

In some embodiments, the audio stream analyzer 230 may be a computer module that analyzes an audio stream for ambiguous expressions and generates a verbal description to disambiguate the audio stream. In some embodiments, the audio stream analyzer 230 may include an ambiguous expression identifier 232 and a verbal description generator 234. When an audio stream is received by the natural language processing system 212, the audio stream analyzer 230 may be configured to analyze the audio stream using natural language processing to identify an ambiguous expression. The audio stream analyzer 230 may first parse the audio stream using the natural language processor 214 and related subcomponents 216-222. After parsing the audio stream, the ambiguous expression identifier 232 may identify one or more phrases present in the audio stream that relate to an object or portion of the video component (e.g., an ambiguous expression). This may be done by, e.g., searching a dictionary (e.g., information corpus 226) using the search application 228. Once an ambiguous expression is identified, the ambiguous expression identifier 232 may be configured to transmit the ambiguous expression to an image processing system (shown in FIG. 1).

The verbal description generator 234 may generate a verbal description that disambiguates the ambiguous expression. This may be done by searching the audio stream for known information related to the ambiguous expression and objects identified by the image processing system. Once the information is identified, the verbal description generator 234 may generate a verbal description using the information. For example, the information may include an object and context related to the object (e.g., what the object depicts). The verbal description generator 234 may then generate a verbal description that include the object and the context depicted by the object.

For example, the ambiguous expression in an audio stream may be "As you can see by this peak, the low this week is about 10% lower than the peak." Based on the analysis of the object (i.e., a chart) and the information contained therein, the verbal description generator 234 may generate the verbal expressions "The chart of ACME stock price for 2018 had a peak of 125 in May 2018" and "or about 113." This verbal expression may then be inserted into the audio stream provided to the user, resulting in a modified audio stream that says "As you can see by this peak <The chart of ACME stock price for 2018 had a peak of 125 in May 2018>, the low this week is about 10% lower than the peak <or about 113>."

Figure 3:
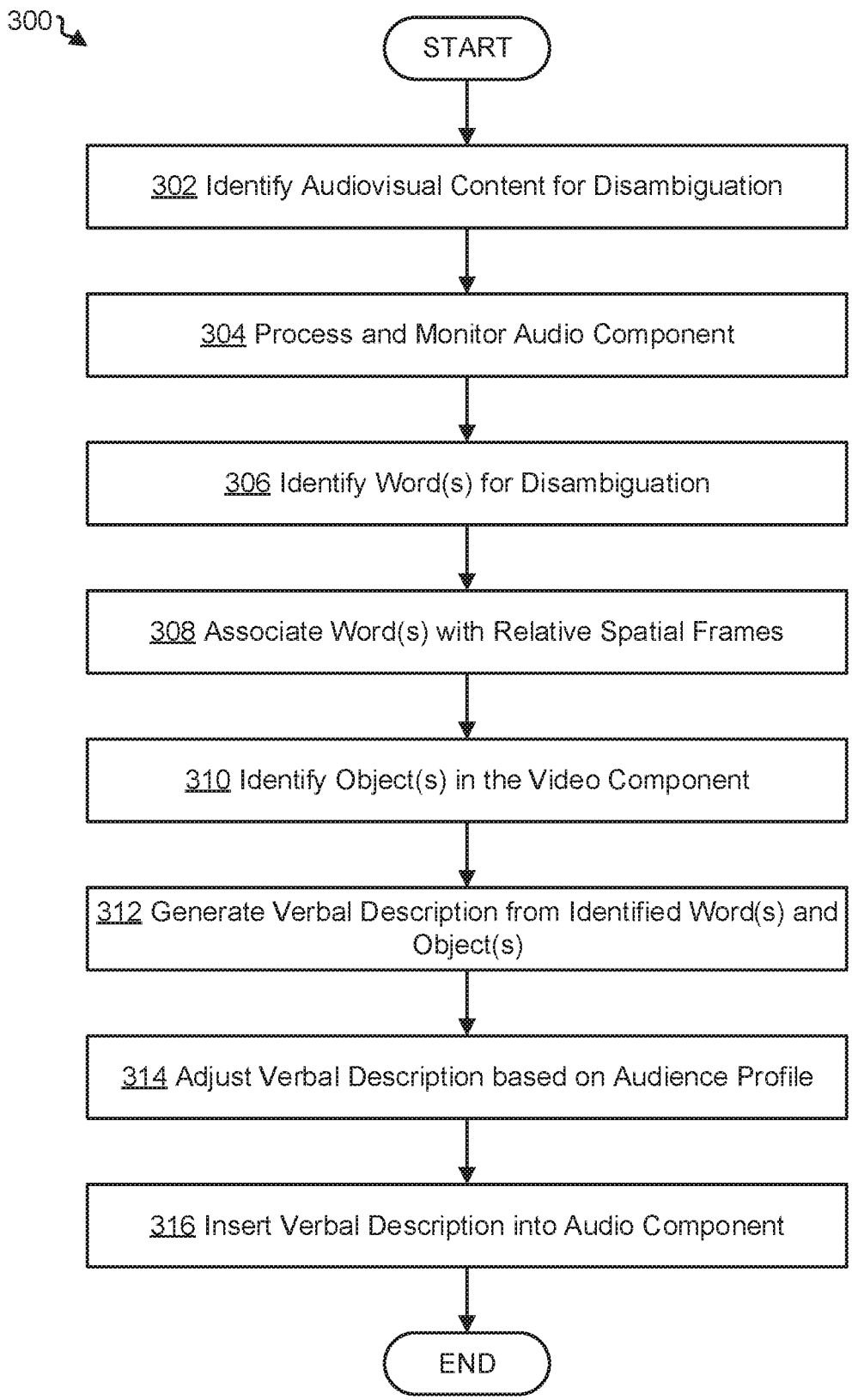
FIG. 3 illustrates a flowchart of an example method for disambiguating an audio component of audiovisual content, in accordance with embodiments of the present disclosure.

FIG. 3 depicts a flowchart of an example method 300 for disambiguating an audio stream of audiovisual content, in accordance with embodiments of the present disclosure. Method 300 can include more or fewer operations than those depicted. Method 300 can include operations in different orders than those depicted. The following discussion will refer to method 300 being performed by a disambiguation service. It is to be understood that the disambiguation service can be implemented by (and, hence, method 300 can be performed by) a computer system (such as computer system 401 depicted in FIG. 4), a collection of computers, one or more virtual machines (including running on a cloud platform, such as that described in FIGS. 5-6), a component of a computer, or firmware or other software running on a computer. In some embodiments, the disambiguation service can be used locally (e.g., on a device recording, editing, or playing an audio component of an audiovisual content), while in others it can be deployed as a service (including over a network and/or using cloud technology).

Method 300 begins at operation 302 where the disambiguation service identifies audiovisual content for disambiguation. In some embodiments, the disambiguation service can identify audiovisual content for disambiguation automatically based on various factors. For example, the disambiguation service can be activated upon receipt of audiovisual content in a file format which indicates a video component, such as an .avi (Audio Video Interleave), .wmv (Windows Media Video), or .mpeg (Moving Picture Experts Group) computer file, or a streaming file format which indicates a video component, such as H.264 (Advanced Video Coding), HEVC (High Efficiency Video Coding), VP8, or VP9. The audiovisual content may optionally have additional video inputs which are not displayed during normal operation (e.g., a news program with video input for news anchors as well as video input for field reporters, where only one of the video streams are provided to viewers at a time). The disambiguation service can identify that disambiguation for the audiovisual content is appropriate for such files or streams when the audiovisual content is played by a device which lacks a video screen or where the video screen is turned off, when a device camera detects that a user is not in front of a video screen, with use of a gaze tracking method to determine the user is not viewing the screen displaying the video component of the audiovisual content, or if a profile of the user indicates that the user is visually impaired (e.g., blind).

In some embodiments, the disambiguation service can identify that only the audio portion of the audiovisual content is being, or has been, transmitted to the user (e.g., an audio-only podcast of an original audiovisual content may be all that is transmitted to a user's device (e.g., a car stereo)), and accordingly identify the corresponding audiovisual content as the content for disambiguation. This may be the case when the disambiguation service is being operated or provided by the source of the audiovisual content (e.g., a media streaming company may include the disambiguation service with its offerings and identify its content which requires disambiguation from its catalog of offerings).

This identification can be performed before a user begins consuming the audiovisual content (either automatically or upon user input), upon detection of a qualifying condition at any point before or during consumption (such as the examples above of lack of screen or user eye contact), or upon user prompt while consuming the audiovisual content (e.g., the user may enter an input that the audiovisual content requires disambiguation).

At operation 304, the disambiguation service processes and monitors the audio component of the audiovisual content. The audio component (i.e., the audio stream) can be processed using techniques for voice to text conversion, including techniques known to those of skill in the art. The processed audio component can yield a text output which can be monitored for word(s) or phrases which may require disambiguation.

At operation 306, the disambiguation service identifies word(s) or phrases for disambiguation (i.e., an ambiguous expression). In some embodiments, this identification can be performed using a dictionary of word(s) or phrases which can be used with pattern matching technology. The disambiguation service can check the text output from the audio component to determine whether the word(s) or phrases used match those in the dictionary, and, upon detecting a match, identify them as word(s) or phrases for disambiguation. In some embodiments, the disambiguation service may contain or access a plurality of dictionaries which can be selected for use with the audiovisual content based on a category of that content. For example, separate dictionaries may be used for finance, weather, sports, or other categories of audiovisual content as the words used in such content may be specific to that content or have different meanings when used in different contexts. In some embodiments, the disambiguation service may utilize natural language processing techniques to identify ambiguous expressions in the text of the audio component.

For example, an audiovisual content may include the statement "As you can see by this peak, the low this week is about 10% lower than the peak." A viewer with access to the video portion of this content may be looking at a graph or chart with a presenter pointing to a peak and a lower value on the chart. A dictionary may identify the term "peak" as a word which requires disambiguation. In some embodiments, the dictionary may identify the term "peak" (or other term) as a word which requires disambiguation when using the context of the word (such as detecting the word "low" within a predefined number of words of "peak"). In other contexts, such as a sports category, the term "peak" may be more likely to refer to an athlete at peak performance or climbing a mountain peak and thus not be present in the sports dictionary as a term to disambiguate.

For another example, an audiovisual content may include the statement "Look at the left of side of this [object of interest]." A viewer with access to the video portion of this content can see what the audio is directing the viewer to, but an audio-only listener will be lacking the necessary information to appropriately follow the audiovisual content. A dictionary may contain the term "look" or the imperative phrase "look at" and identify that disambiguation is required. Additionally, or alternatively, terms such as "left" or "right" which indicate a direction can be present in the dictionary for the disambiguation service to provide disambiguation as to what is to the left or right of objects in video components of audiovisual content.

In some embodiments, this identification may use a probability that such word(s) or phrases will need disambiguation. Continuing with the above examples, a term which may only sometimes need disambiguation such as "peak" may have a lower probability value where as "look at" may have a higher probability value. In some embodiments, a user can input a setting for how often they are interested in having word(s) or phrases disambiguated, such that a high setting will result in more word(s) and phrases being identified and a low setting will result in words with low probabilities not being disambiguated.

In some embodiments, a user can identify word(s) or phrases for disambiguation. This can occur if a listener hears a word in the audio content which is unclear and the user can provide an input (e.g., spoken to an intelligent speaker, pressing a button on a remote, entering a command into a user interface) indicating that the word(s) or phrases should be disambiguated by the disambiguation service. This could also occur by a presenter or subject of the audiovisual content indicating disambiguation is appropriate in a fashion similar to how presenters of slide shows can provide a direction such as "next slide please," a presenter who knows a disambiguation service can or will be used can provide direction that disambiguation is appropriate such as by saying, "[disambiguation service name] clarify the preceding sentence for audio listeners," or other such command.

In some embodiments, the system may determine which expressions are ambiguous automatically, or it may build or expand a dictionary. This may be done by detecting words or phrases that a user flags as ambiguous (e.g., the speaker going back over a presentation, a user listening to the presentation, etc.). In some embodiments, the system may determine which expressions are ambiguous by analyzing moments where the user stops and repeats a section, or looks at the video component while listening to that section.

At operation 308, the disambiguation service associates the identified word(s) or phrases with relative spatial frames (e.g., parts of the video component that are being referenced). When a word or phrase such as the examples above or further examples such as "look here," "this section of the picture," "left side of the bar graph," "further up the screen," etc. are identified, the disambiguation service associates the word(s) or phrases with the relative context. This can vary in embodiments and/or depending on the context of the identified word(s) or phrases. In some embodiments, the gestures or other movements of the speaker or other person in the video component (e.g., pointing fingers, circling motions, a stick, laser or other pointer, superimposed lines on an image) can be identified in the context of the term that points to specific area or points on the screen. As such, the relative frame of reference can be associated with the identified word(s) or phrases due to visually observable phenomena. For example, when "look here" is identified and the video component includes a presenter pointing to an object on the screen, "look here" can be associated with the object.

In some embodiments, relative references from prior objects of interest can also be used by the disambiguation service. If the words "look here" have been associated with a bar graph due to a presenter pointing at it, and the phrase "left side of the bar graph" is detected in relative proximity to "look here," the service can associate this phrase with the left side of the previously associated bar graph.

In some embodiments, relative references can be identified using object recognition techniques. For example, if image detection is used with the video component of the audiovisual content and the image detection detects a person on the left, a dog in the middle, and a ball on the right, when the phrase "to the left of the ball," is identified, the disambiguation service can associate this phrase with the dog.

In some embodiments, the disambiguation service may verify whether the identified frame of reference (e.g., related to a gesture) is in the camera (i.e., visible on the screen). The disambiguation service may also determine the way that the gesture is pointed (by touch, pointing finger, or any hand gestures) and whether that is visible in the camera.

Based on the verification, there are two scenarios. First, the remote audience can see the screen but not the speaker (and, therefore, not the gesture) although the spoken reference is audible. In this case, the disambiguation service may need to highlight or circle the area of the screen and add close captioning in words too. Second, the remote audience can see the speaker and his gesture, but the area he is pointing on the screen is not visible. In this case, a verbal description of the object/area he is pointing would disambiguate the reference.

At operation 310, the disambiguation service identifies one or more objects (e.g., objects of interest) in the corresponding portion of the video component. The objects may be identified using image identification techniques (e.g., object recognition, facial recognition, etc.). In some embodiments, the image identification techniques may be selected based on output from the analyzation of the audio component. For example, if the audio component includes the ambiguous expression "as can be seen from this pie chart, 55% of those interviewed agreed," the disambiguation service may determine that the object of interest is likely a pie chart. Accordingly, the disambiguation service may use an image processing technique that is adapted to identify and extract information from pie charts, as opposed, for example, to an image processing technique for performing facial recognition.

In some embodiments, when detecting the object of interest (e.g., a patch of a cloud, a profit-margin bar graph), the disambiguation service may utilize several inputs. For example, the disambiguation service may utilize location of the point of reference, the image projected on the screen, the subject matter of the presentation/image projected (e.g., from the analysis of the audio stream), and/or a set of rules related to the subject matter. The set of rules may include, for example: if the image is a chart, trace the lines to understand the trajectory; if the image is a face, recognize the expression; and if the image is a body, recognize body language or gestures.

In some embodiments, the disambiguation service extracts, from the image(s) and/or audio component, context of the object. The context may include information about the object (e.g., type, location, etc.) and/or information conveyed by the object. For example, using the set of image processing rules, if the object is a line graph (e.g., of a stock), the disambiguation service may extract information such as the name of the stock, the dates covered by the line graph, the price of the stock at each date, the trajectory of the price, and information related to the ambiguous expression (e.g., information about the circled peak). Similarly, if the object is moving (e.g., it is a dog), the disambiguation service may determine what the object is doing (e.g., swimming, digging, etc.). As another example, the object which is being described may a person. The person may be making facial expressions or hand gestures which when accompanied with the audio causes the interpretation to vary. "Gee, thanks!" when also accompanied with a gesture such as an eye roll has a very different meaning than the expression by itself. The disambiguation service may use image processing to determine That expression may be accompanying the audio.

At operation 312, the disambiguation service generates a verbal description from the identified word(s) and object(s), as well as any context extracted from the video component. The verbal description is a description of the object (and/or what the object is doing) that disambiguates the ambiguous expression. In some embodiments, the verbal description may be generated using image recognition. For example, if the disambiguation service determines that the object of interest is a map, it may generate a verbal description that essentially reads the map. Similarly, if the object of interest is a physical object, the disambiguation service may perform object recognition to determine what the object of interest is. In embodiments, there would be sub-flows for if it appears to be a person, chart, etc. In some embodiments, the disambiguation service may convert the image to words using current accessibility techniques (e.g., such as those used by webpages to assist blind persons).

In some embodiments, the verbal description may be generated by combining the ambiguous expression with the identified object and context to apply the disambiguation. For example, if the broadcasts says, "watch that dog go," an audio-only consumer would not have any idea what the dog is doing. However, if the image analysis extracts information that indicates that the dog is riding a skateboard, a verbal description may be generated that says, "the dog is riding a skateboard."

At operation 314, the disambiguation service adjusts the verbal description based on one or more audience profiles. This operation can be optional in some embodiments. By adjusting the verbal description, the description/additional annotation can further be enhanced to provide supplemental information based on the knowledge level of the audience on that subject. The customized annotation/explanation may be user-profile based.

Adjusting the verbal description may include first identifying the profile of the user, and computing a familiarity score based on the subject and/or object of interest. The familiarity score indicates a level of knowledge of the user with the subject and/or object of interest. For example, the familiarity score may be a range from 0 to 1, where 1 means that the user is very familiar with the object and 0 mean the user is very unfamiliar with the object. The verbal description can then be adjusted (e.g., more information provided, less information provided, simpler information provided, etc.)

For example, a user may be listening to a financial podcast based on a video presentation. Based on the subject, the disambiguation service may extract relevant familiarity scores from the user profile. In this example, the user profile may indicate the familiarity score for a particular user as:
  Stock Price: 0.8
  Market Cap: 0.5
  P/L Ratio: 0.2
  Cash Flow: 0.0

The disambiguation service may also keep a dictionary of terminology and explanation for each score levels. For example, the dictionary and related explanation for Market Cap familiarity scores may include:
  0.0-0.2: Market Cap represents how much worth the company is worth.
  0.3-0.6: Market Cap is the effective value of the company in terms of current stock price. It is typically computed by multiplying current stock price by outstanding shares in the market. Market cap can fluctuate with the share price.
  0.7-0.9: Market Cap is the value of total share value plus any good will and assets. Market cap indicates how big financially a company is. A larger value doesn't always mean that the company is financially sound. However, the impact of a company on financial market and general economy is linked to the market cap.

The familiarity score can be computed based on many factors. For example, in some embodiments, the user may enter their perceived familiarity scores for a range of topics. In some embodiments, the user's familiarity scores may be automatically generated based on, for example, the user's profession, education, previous operations, experience in the field, and/or the self-expressed level of knowledge. These scores may be adjusted based on user feedback (e.g., if the user indicates that the verbal descriptions are too basic, the familiarity score may be increased) and machine learning techniques.

At operation 316, the disambiguation service inserts the verbal description into the audio component of the audio-visual content. This may be performed by generating an artificial audio waveform of a machine reading the verbal description and inserting it into the audio component near (e.g., after) the ambiguous expression to generate a modified audio component or stream. The modified audio component is then sent to the user's device (e.g., a remote device) for playback. In some embodiments, such as during a live broadcast, the modified audio component is played to the user on delay to enable the disambiguation of the audio component. After inserting the verbal description into the audio component and sending it to the user, the method 300 may end.

Figure 4:
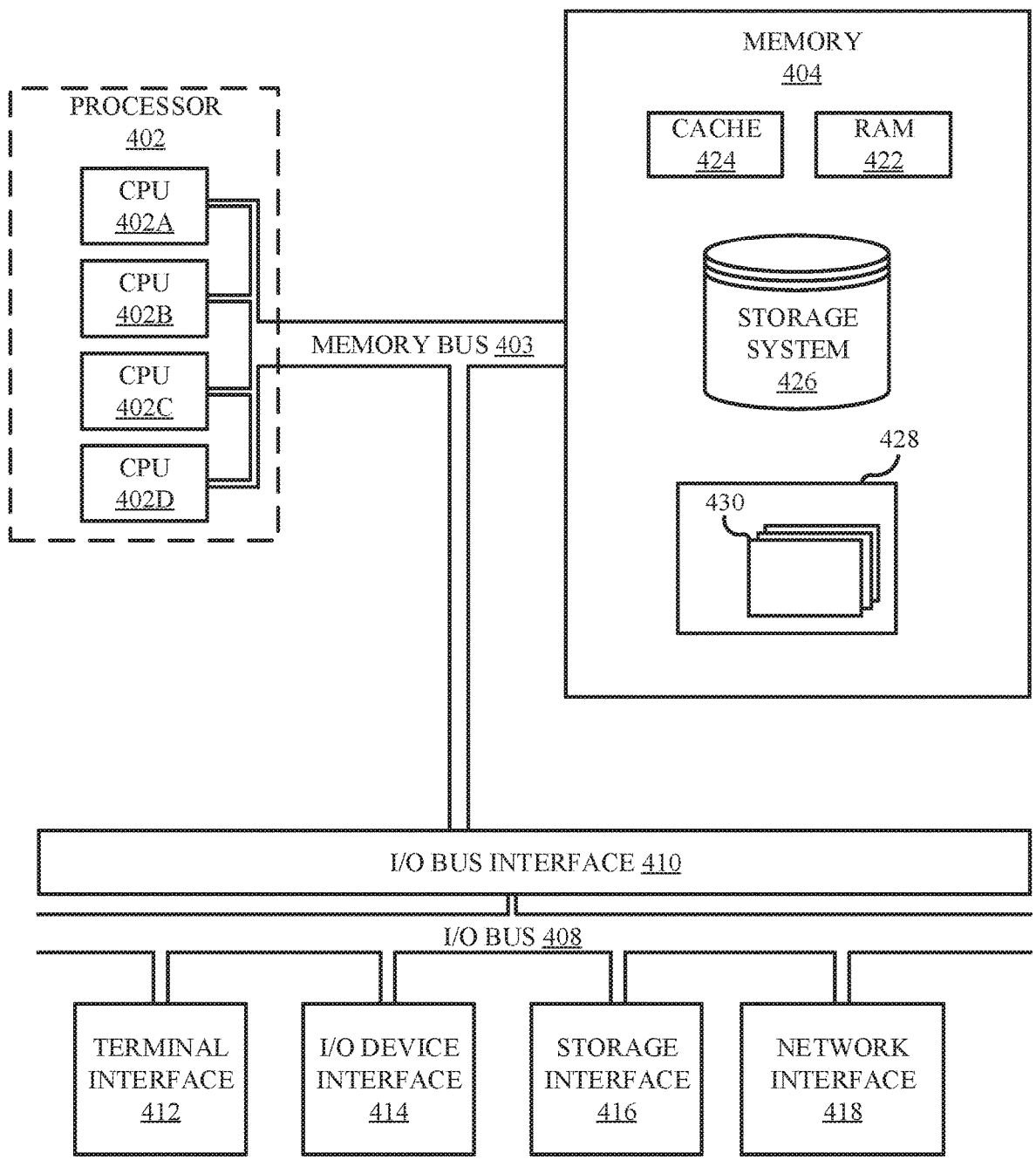
FIG. 4 illustrates a high-level block diagram of an example computer system that may be used in implementing one or more of the methods, tools, and modules, and any related functions, described herein, in accordance with embodiments of the present disclosure.

Referring now to FIG. 4, shown is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
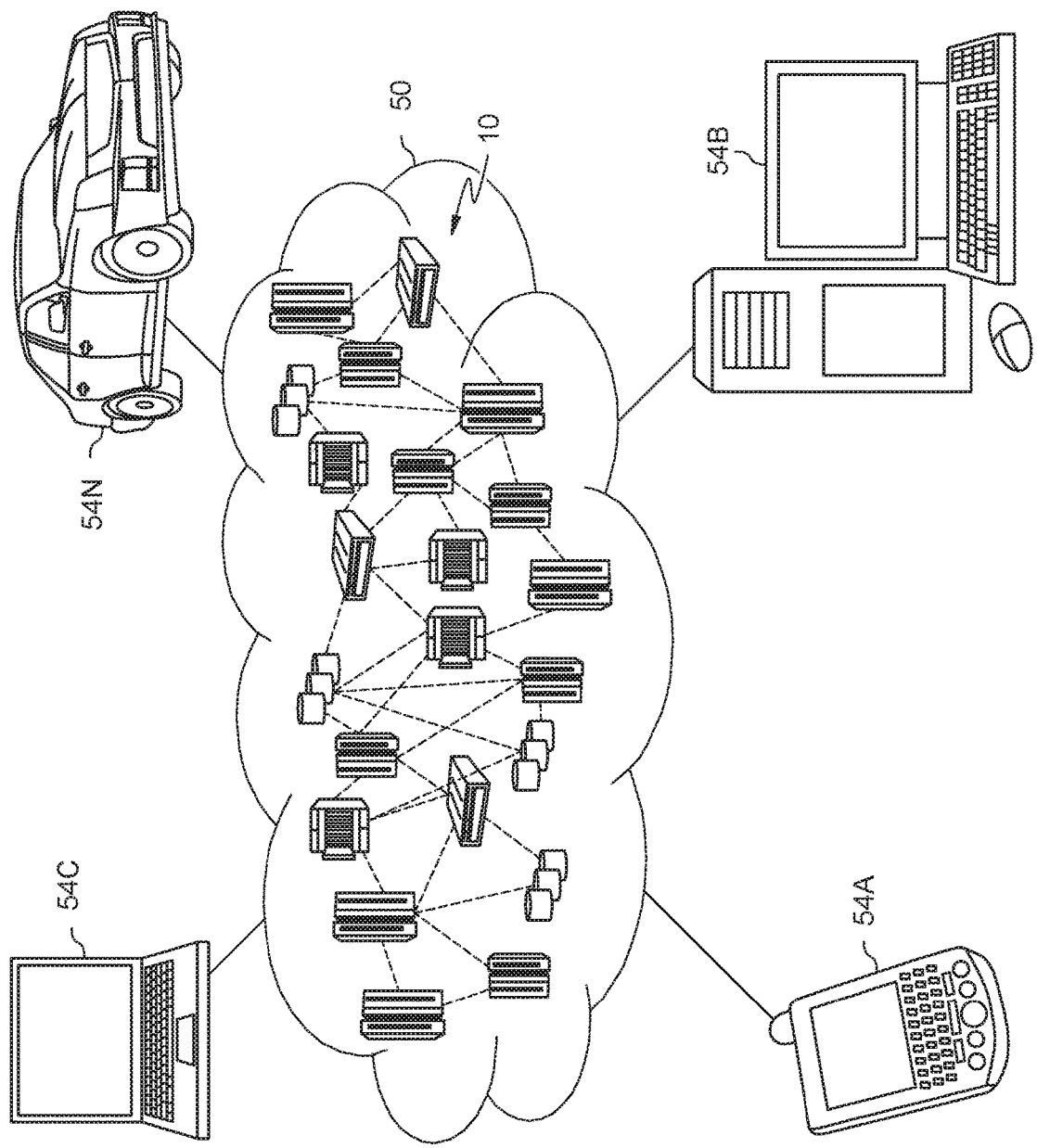
FIG. 5 depicts a cloud computing environment according to some embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
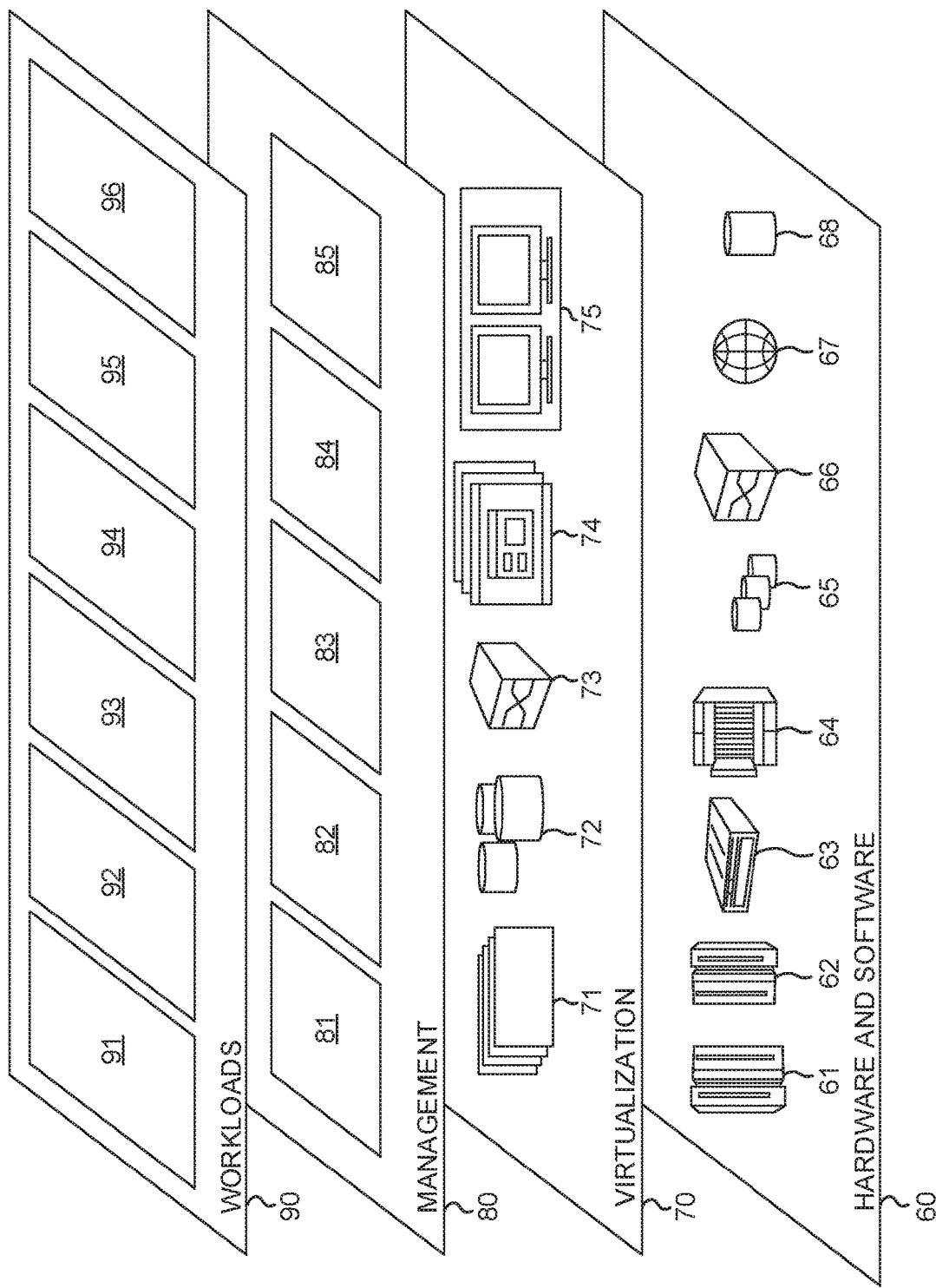
FIG. 6 depicts abstraction model layers according to some embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and audio disambiguation 96. Audio disambiguation 96 can be a workload or function such as that described in FIG. 3 above. In other embodiments, only a portion of the audio disambiguation 96 may be cloud based, such as a natural language processing system as depicted in FIG. 2.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications, alterations, and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s). Additionally, it is intended that the following claim(s) be interpreted as covering all such alterations and modifications as fall within the true spirit and scope of the invention.

What is claimed is:

1. A method for disambiguating an audio component extracted from audiovisual content, the method comprising:
    identifying audiovisual content that includes an audio component and a video component;
    detecting an ambiguous expression in the audio component;
    determining to disambiguate the audio component for a user that is consuming the audio component, wherein determining to disambiguate the audio component comprises one or more selected from the group consisting of:
        determining that the user's screen is off;
        determining that the user is receiving the audio component but not the video component;
        determining, based on a gaze of the user, that the user is not watching the video component; and
        determining, based on a user profile, that the user has a visual impairment;
    identifying, in the video component, an object referenced by the ambiguous expression;
    generating a verbal description of the object; and
    inserting the verbal description into the audio component to generate a modified audio component.

2. The method of claim 1, the method further comprising:
    transmitting the modified audio component to a user device.

3. The method of claim 1, wherein detecting the ambiguous expression in the audio component comprises:
    comparing words and phrases in the audio component to a dictionary of ambiguous expressions; and
    determining that at least one word or phrase in the audio component is in the dictionary of ambiguous expressions.

4. The method of claim 1, the method further comprising:
    modifying the verbal description of the object prior to inserting the verbal description into the audio component, wherein the modifying comprises:
        determining a subject of the object;
        determining, using a user profile for the user consuming the audio component, a familiarity score of the user, the familiarity score indicating a level of familiarity of the user with the subject; and
        modifying the verbal description of the object based on the familiarity score of the user.

5. The method of claim 1, wherein detecting the ambiguous expression in the audio component comprises:
    detecting, using natural language processing, a phrase in the audio component that directs a focus of the user to a portion of the video component; and
    determining that the portion of the video component is not visible to the user.

6. A system for disambiguating an audio component extracted from audiovisual content, the system comprising:
    a memory; and
    a processor communicatively coupled to the memory, wherein the processor is configured to perform a method comprising:
        identifying audiovisual content that includes an audio component and a video component;
        detecting an ambiguous expression in the audio component, wherein detecting the ambiguous expression in the audio component comprises:
            detecting, using natural language processing, a phrase in the audio component that directs a focus of a user to a portion of the video component; and
            determining that the portion of the video component is not visible to the user;
        identifying, in the video component, an object referenced by the ambiguous expression;
        generating a verbal description of the object; and
        inserting the verbal description into the audio component to generate a modified audio component.

7. The system of claim 6, wherein the method further comprises:
    transmitting the modified audio component to a user device.

8. The system of claim 6, wherein the method further comprises:
    determining to disambiguate the audio component for the user.

9. The system of claim 8, wherein the user is consuming the audio component, and wherein determining to disambiguate the audio component for the user comprises one or more selected from the group consisting of:
    determining that the user's screen is off;
    determining that the user is receiving the audio component but not the video component;
    determining, based on a gaze of the user, that the user is not watching the video component; and determining, based on a user profile, that the user has a visual impairment.

10. The system of claim 6, wherein detecting the ambiguous expression in the audio component comprises:
   comparing words and phrases in the audio component to a dictionary of ambiguous expressions; and
   determining that at least one word or phrase in the audio component is in the dictionary of ambiguous expressions.

11. The system of claim 6, wherein the method further comprises:
   modifying the verbal description of the object prior to inserting the verbal description into the audio component, wherein the modifying comprises:
      determining a subject of the object;
      determining, using a user profile for the user consuming the audio component, a familiarity score of the user, the familiarity score indicating a level of familiarity of the user with the subject; and
      modifying the verbal description of the object based on the familiarity score of the user.

12. A computer program product for disambiguating an audio component extracted from audiovisual content, the computer program product comprising a computer readable storage medium having program instructions embodied therewith, the program instructions executable by a computer to perform a method comprising:
   identifying audiovisual content that includes an audio component and a video component;
   detecting an ambiguous expression in the audio component;
   determining to disambiguate the audio component for a user that is consuming the audio component, wherein determining to disambiguate the audio component comprises one or more selected from the group consisting of:
      determining that the user's screen is off;
      determining that the user is receiving the audio component but not the video component;
      determining, based on a gaze of the user, that the user is not watching the video component; and
      determining, based on a user profile, that the user has a visual impairment identifying, in the video component, an object referenced by the ambiguous expression;
   generating a verbal description of the object; and
   inserting the verbal description into the audio component to generate a modified audio component.

13. The computer program product of claim 12, wherein the method further comprises:
   transmitting the modified audio component to a user device.

14. The computer program product of claim 12, wherein detecting the ambiguous expression in the audio component comprises:
   comparing words and phrases in the audio component to a dictionary of ambiguous expressions; and
   determining that at least one word or phrase in the audio component is in the dictionary of ambiguous expressions.

15. The computer program product of claim 12, wherein the method further comprises:
   modifying the verbal description of the object prior to inserting the verbal description into the audio component, wherein the modifying comprises:
      determining a subject of the object;
      determining, using a user profile for the user consuming the audio component, a familiarity score of the user, the familiarity score indicating a level of familiarity of the user with the subject; and
      modifying the verbal description of the object based on the familiarity score of the user.

\* \* \* \* \*